United States Patent
Greer

(10) Patent No.: US 11,381,046 B2
(45) Date of Patent: Jul. 5, 2022

(54) EXTENDING OUTLET ACCESS DEVICE

(71) Applicant: Michael Greer, North Royalton, OH (US)

(72) Inventor: Michael A Greer, North Royalton, OH (US)

( * ) Notice: Subject to any disclaimer, the term of this patent is extended or adjusted under 35 U.S.C. 154(b) by 0 days.

(21) Appl. No.: 16/699,030

(22) Filed: Nov. 28, 2019

(65) Prior Publication Data

US 2020/0328568 A1    Oct. 15, 2020

Related U.S. Application Data

(60) Provisional application No. 62/832,704, filed on Apr. 11, 2019.

(51) Int. Cl.
| | |
|---|---|
| *H01R 31/06* | (2006.01) |
| *H01R 35/02* | (2006.01) |
| *H01R 13/502* | (2006.01) |
| *H01R 31/02* | (2006.01) |
| *H01R 13/633* | (2006.01) |
| *H01R 13/717* | (2006.01) |

(52) U.S. Cl.
CPC .......... *H01R 31/06* (2013.01); *H01R 13/502* (2013.01); *H01R 31/02* (2013.01); *H01R 35/02* (2013.01); *H01R 13/633* (2013.01); *H01R 13/717* (2013.01)

(58) Field of Classification Search
CPC ...... H01R 31/06; H01R 31/02; H01R 13/502; H01R 13/633; H01R 13/717
USPC ........................................................ 439/152
See application file for complete search history.

(56) References Cited

U.S. PATENT DOCUMENTS

| | | | | |
|---|---|---|---|---|
| 2,551,533 | A * | 5/1951 | Gernheuser | H01R 13/633 439/160 |
| 4,659,161 | A * | 4/1987 | Holcomb | H01R 31/02 439/490 |
| 5,658,158 | A * | 8/1997 | Milan | H01R 13/514 439/214 |
| 7,004,786 | B1 * | 2/2006 | Bloom | H01R 13/72 439/142 |
| 7,163,409 | B1 * | 1/2007 | Chen | H01R 25/006 439/131 |
| 7,229,302 | B1 * | 6/2007 | Lai | H01R 25/003 439/214 |
| 7,488,204 | B2 * | 2/2009 | Hsu | H01R 25/003 439/106 |
| 7,497,740 | B2 * | 3/2009 | Mei | H01R 13/514 200/51 R |
| 7,510,426 | B2 * | 3/2009 | Hwang | H01R 13/60 191/12.4 |
| 7,607,928 | B2 * | 10/2009 | Schriefer | H01R 25/003 439/214 |
| 7,874,856 | B1 * | 1/2011 | Schriefer | H01R 13/514 439/214 |
| 8,142,199 | B1 * | 3/2012 | Almouli | H01R 35/04 439/10 |

(Continued)

*Primary Examiner* — Harshad C Patel

(57) ABSTRACT

An electrical extending outlet having a rigid body slidably extendable such that, in use, extends the outlet of a wall above a restrictive surface. The rigid body has a male connector on its lower end that is rotatable to allow the rigid body to be positioned in a number of positions relative to the wall outlet. On the upper end of the rigid body is at least one female outlet which a user can insert a male plug of an electrical device. The rigid body has a fastener to attach the rigid body to the wall.

19 Claims, 5 Drawing Sheets

(56) References Cited

U.S. PATENT DOCUMENTS

| | | | | |
|---|---|---|---|---|
| 8,376,782 | B2* | 2/2013 | Govekar | H01R 25/006 |
| | | | | 439/652 |
| 8,465,307 | B2* | 6/2013 | Shieh | H01R 31/06 |
| | | | | 439/173 |
| 8,500,484 | B2* | 8/2013 | Hu | H01R 35/04 |
| | | | | 439/527 |
| 9,147,985 | B1* | 9/2015 | Noriega | H01R 25/003 |
| 9,190,785 | B1* | 11/2015 | Rogero | H01R 35/04 |
| D886,064 | S * | 6/2020 | Chen | H01R 25/003 |
| | | | | D13/139.8 |
| 2005/0014412 | A1* | 1/2005 | Wharton | H01R 13/633 |
| | | | | 439/352 |
| 2011/0021040 | A1* | 1/2011 | Garb | H01R 31/065 |
| | | | | 439/13 |
| 2012/0028505 | A1* | 2/2012 | Weber | H01R 25/003 |
| | | | | 439/638 |
| 2013/0115804 | A1* | 5/2013 | Vallon | H01R 25/003 |
| | | | | 439/501 |
| 2014/0120765 | A1* | 5/2014 | Lombardo | H01R 25/003 |
| | | | | 439/501 |
| 2017/0199334 | A1* | 7/2017 | Wang | G02B 6/3897 |
| 2018/0062302 | A1* | 3/2018 | DeBlois | H01R 13/514 |
| 2018/0062331 | A1* | 3/2018 | Finn | H01R 24/22 |
| 2018/0375317 | A1* | 12/2018 | Dombrowski | H01R 25/142 |

* cited by examiner

FIG 5

1 - Body
2 - Access Point
3 - Male End
4 - Adjustable
5 - Fastener
6 - Attachment Point
7 - Pivot Joint
8 - Rotating Male End
9 - Rotating Access Point
10 - Ejection Button
11. Light Source

EXTENDING OUTLET ACCESS DEVICE

This application claims the benefit of Provisional Application No. 62/832,704, filed Apr. 11, 2019.

BACKGROUND OF THE INVENTION

Electrical users desire an easy way to extend an electrical outlet up to a height that is more convenient for users. Often, electrical outlets are found behind desks or other types of furniture and become difficult to use. Users are required to crawl under a desk to unplug an electrical device or even worse, move heavy furniture in order to access the blocked outlets. An embodiment of the present invention plugs into a wall outlet at knee height and extends up to a more convenient height to allow users to plug in household items without having to bend over or move furniture.

SUMMARY OF THE INVENTION

Disclosed is an extending outlet access device, which is made up of the following components: (1) a frame having a right side, left side, top and bottom, with the right and left sides being substantially parallel to each other and the top and bottom likewise being substantially parallel to each other; (2) an access point on one face, located at one end of the rectangular shape; (3) a male end protruding off the face opposite or adjacent to (2) the access point.

The device may also have one or a combination of the following: a portion (4) of the (1) body may be adjustable in length and shape. The intent is to allow the (1) body to form to alternate dimensions to accommodate the user. These possibilities include, but in no way limit the scope of methods possible, by utilizing a telescoping type construction, by utilizing a flexible material that allows pliability, a sliding electrical contact system and/or by utilizing a swivel point that allows directional change. The body may be a combination of a solid component and a portion of an electrical cord. The body may be one solid shape. It may be one solid cast piece with no moving parts. Again, the intent is to provide alternative sizes and shapes to aid in access.

The device may also have the following individual options or any combination of: a (3) male end or (2) access point may be fixed in place or utilize a (7) multi surface, pivoting, hinged, swivel joint or created with a flexible material in a manner that allows the (1) body to pivot in various directions. The (8) rotating male end may rotate inside of the (1) to allow horizontal movement along a surface. The (9) rotating access point may rotate inside of the (1) body to allow a traditional vertical alignment of the access point.

The (3) male end and (2) access point may be for access to electrical systems, data systems, wireless systems or audio systems. The goal of the device to provide more convenient access to these outlet receptacles.

The (1) body may be constructed of a rigid material or flexible material. The goal of the body is to provide connection and support of the (2) access point to the (3) male end. The (1) body may be of any color or even translucent; ; the complete (1) body or portions of (1) body may be illuminated by a host of methods; the (2) access point or (3) male end may be illuminated; the (1) body or portions of (1) may incorporate a technology to communicate with other devices; the (2) access point end may have multiple (2) access points; the (1) body may have more than one (3) male end; Portions of or the entire system may be interconnected to other systems; These connections may be by Wifi, cellular or other methods: This device may respond and perform functions when instructed to do so by other technology.

A light source (11) may be added to the device to provide a ready standby of illumination on command.

The illuminating methods involved in this device may be accomplished by adding light emitting diodes, electroluminescence, incandescent bulbs, florescent bulbs, neon gases or similar methods. Common illuminating practices known to the standard user will fall under the scope of this device.

It is noted that the (1) body, (2) access point or (3) male end may be shaped as, but not limited to, a rectangle, a circle, an oval, a triangle, a pyramid, a wedge, a tube or a polygon and still fall under the claims of this device. The shape selected may be based on the desired performance.

The (1) body, (2) access point or (3) male end may have lettering, logos, embossments, trademark designs or names carved, etched, scripted, pressed, shaped, formed or otherwise indicated on their associated parts.

The (1) body, (2) access point or (3) male end may have a means to attach to a structure, furniture, receptacle or electrical device. The goal is to be able to secure the device in place. This may include (5) holes molded or otherwise created into the (1) body; (2) access point or (3) male end for a fastener to fit through; or an adhesive applied to the device's structure that bonds this device to a wall or cabinet. This may also include attachment points (6) anchored to or molded into the (1) body for the purpose of allowing attachment to another object; the (6) attachment point can be located in any location on the (1) body. This may also include Clips, snaps, hook and loop systems, screws, nails, adhesives. Again, the goal of the attachment point is to further secure the device in place.

The device may contain a (10) ejected button that is integrated into the body of the device. This (10) ejector button may be located on the face, sides or top of the device. The purpose of the (10) ejector button is to disconnect the plugged in component and to become separated from this device. The (10) ejector button may be a design that can be pressed, twisted, flipped, toggled or pulled and still fall under the scope of this device. The (10) ejector button can also be orchestrated into other activating methods. These alternate methods can include a lever, knob, toggle, switch, plunger and be included in the embodiment of this device. The goal of the (10) ejector button is to provide an alternative method of disconnecting the plugged in component without transferring the pulling action throughout the entire device.

The device may be anchored to a wall, furniture, structure or another object using a variety of fasteners and methods. These can, but are not limited to, screws, nails, hook and loop systems, straps, adhesives, adhesive strips, double sided adhesive and magnets.

The disclosed device is unique because it extends an outlet to a more comfortable height for the user and can be fastened in place for repeated use. It provides a secure point in which to plug items into with one hand. Most outlets in a home are approximately 12"-16" off the ground. This is a very uncomfortable height for people with bad backs and also makes access to the receptacle difficult when furniture is blocking the receptacle. This device extends the outlet horizontally or vertically for better access and may fasten to the wall to provide a stationary point vs a typical extension cord laying on the ground.

The disclosed device is superior to other known extension devices because it provides a mountable access point for electricity, data or other signals. This device employs a (1) body that that has one end with a (3) male end that plugs into a wall outlet, and a (2) access point that mirrors the wall outlet yet relocates it to a more convenient location for the user. The (1) body is able to be mounted in a fixed location for continual reuse.

This disclosure will now provide a more detailed and specific description that will make reference to the accompanying drawings. The drawings and specific descriptions of the drawings, as well as any specific or alternative embodiments discussed, are intended to be read in conjunction with the entirety of this disclosure. The Extending outlet access device may, however, be embodied in many different forms and should not be construed as being limited to the embodiments set forth herein; rather, these embodiments are provided by way of illustration only and so that this disclosure will be thorough, complete and fully convey understanding to those skilled in the art.

BRIEF DESCRIPTION OF THE DRAWINGS

The advantages, nature and various additional features of the invention will appear more fully upon consideration of the illustrative embodiment of the invention which is schematically set forth in the figures, in which:

FIG. 5.—Glossary of call outs

DETAILED DESCRIPTION OF THE INVENTION

The present invention will be explained in further detail by making reference to the accompanying drawings, which do not limit the scope of the invention in any way.

Figure 1:
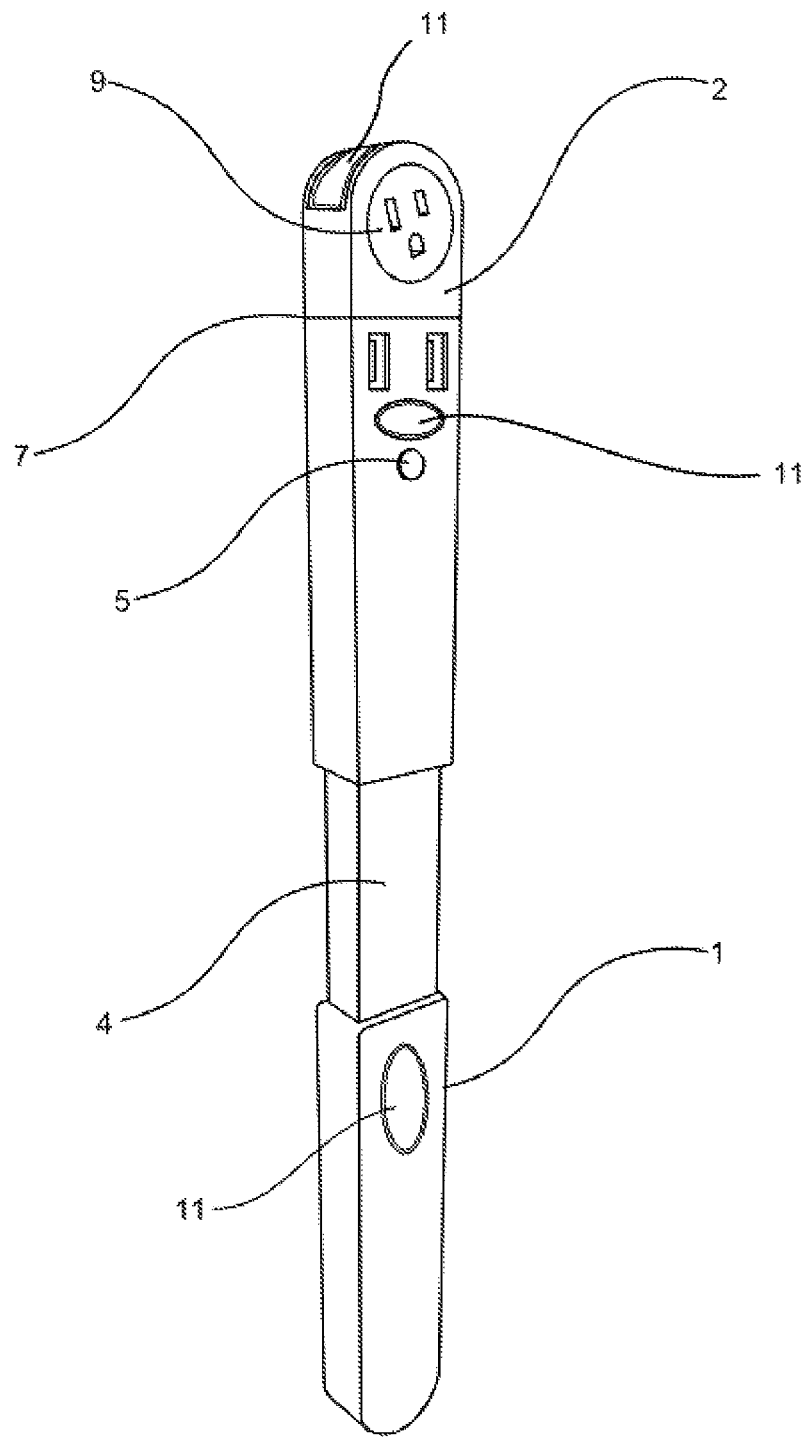
FIG. 1.—An embodiment of the disclosed device—front view.

FIG. 1 shows the device is made up of the following components: (1) a frame having a right side, left side, top and bottom, with the right and left sides being substantially parallel to each other and the top and bottom likewise being substantially parallel to each other.

The device has a (3) male end that will be inserted into a wall outlet to transfer electricity, USB, USBc, micro-USB, data or other functions to the (2) access point. The (2) access point and (3) male end may be compatible with the intended receptacle.

The (3) male end will be joined with the specific wall receptacle and will have the appropriate end to facilitate transfer of the intended power, signal or package. The (3) male end may have a (7) detachable pivoting swivel that allows independent movement of the (1) body and still allow the intended signal or power to be delivered to the (2) access point. The (1) body may carry the package load or current from the (3) male end to the (2) access point. The (1) body may be able to be formed into alternative shapes. The (1) body may be also be able to solidify into a structure that is capable of carrying its own weight. An (2) access point may be attached to the (1) body by a (7) detachable, pivoting, swiveling joint that allows access from all directions and still allow the intended package to be delivered. The (8) rotating male end may rotate inside of the (1) body to allow horizontal movement along a surface. The (9) rotating access point may rotate inside of the (1) body to allow a traditional vertical alignment of the access point.

The device has multiple provisions to attach to a wall, furniture or the receptacle being extended using this invention. A (5) hole may be molded or otherwise created into any of the components of this device, including the (1) body, (2) access point or (3) male end. An (6) attachment point may molded into the device to allow a fastener to restrain the device in a specific location or to another object. This (6) attachment point may allow the insertion of a strap, hook and loop system, wire and similar items for the purpose of restraining the device in place.

The device may have an (10) ejector button, plunger or lever that is located in its embodiment that, when pressed, may eject the component that is engaged into the (2) access point.

Figure 2:
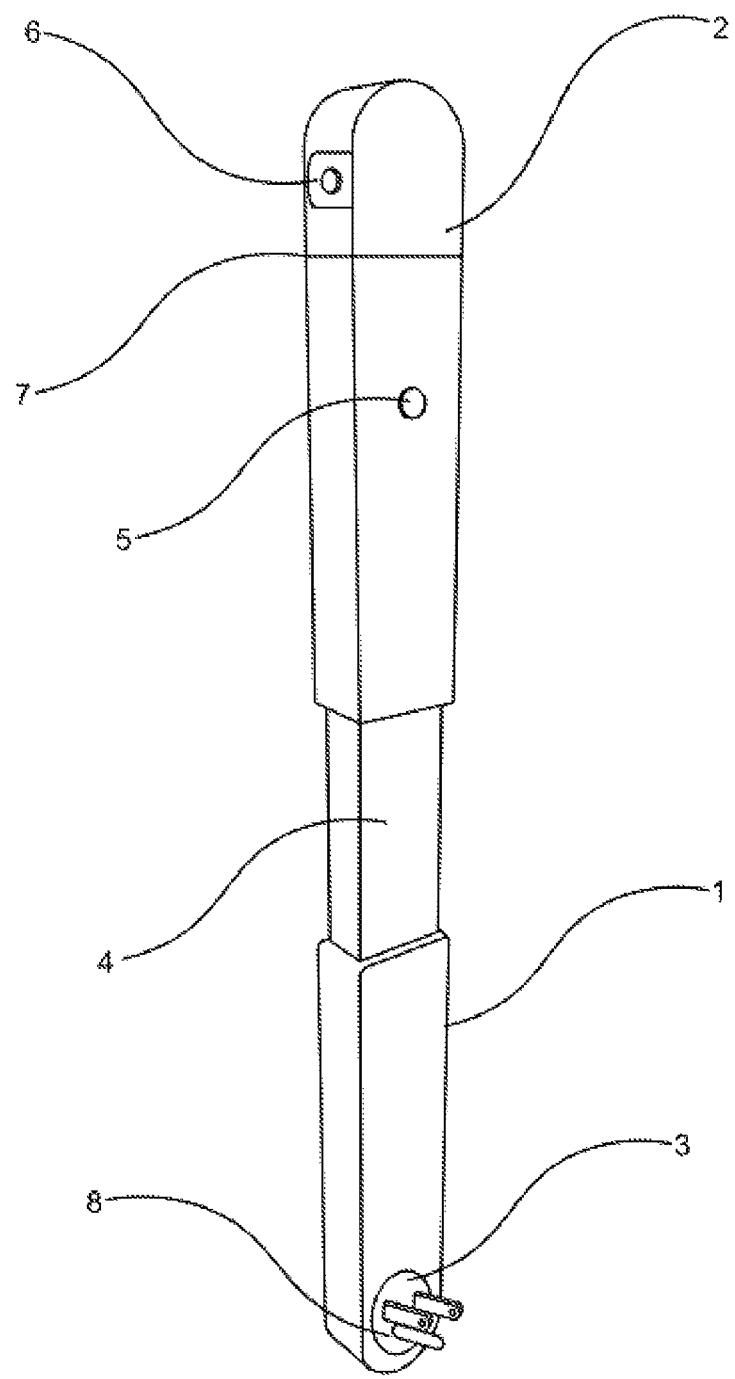
FIG. 2.—An embodiment of the disclosed device—rear view.
Figure 3:
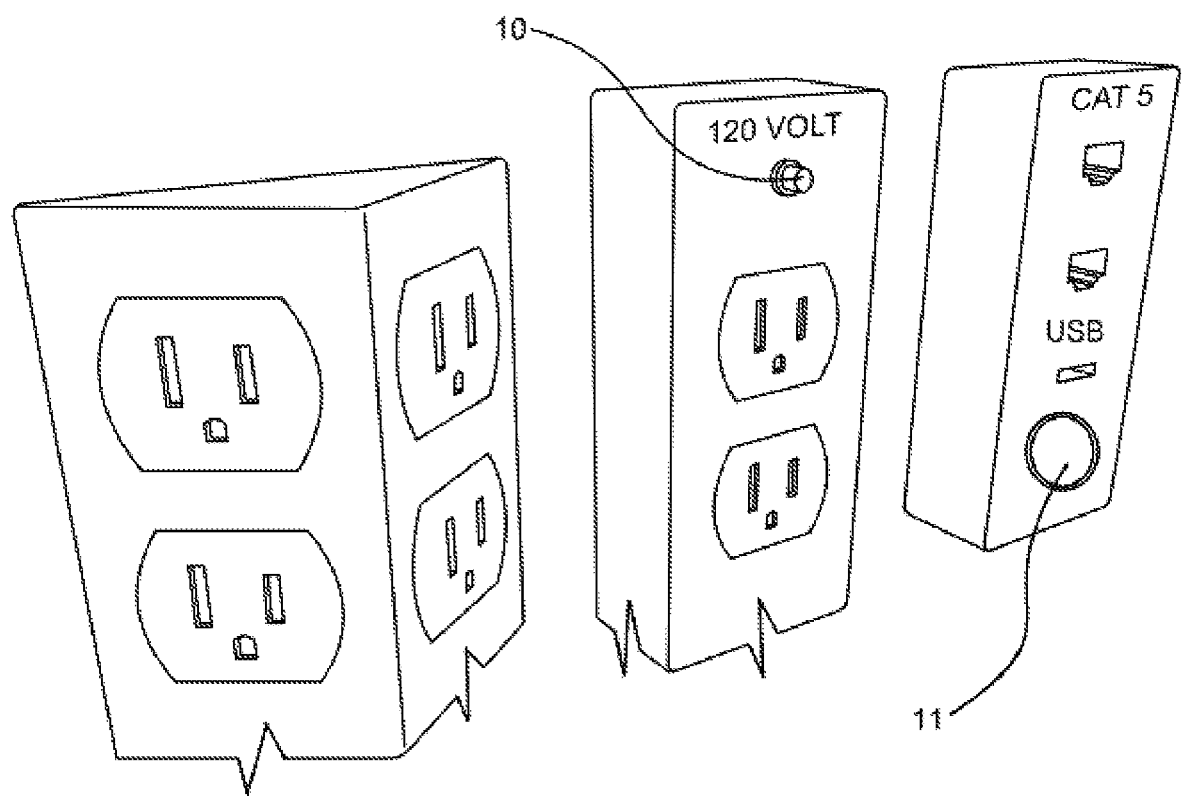
FIG. 3.—Alternative example Access Point/Male End configurations.
Figure 4:
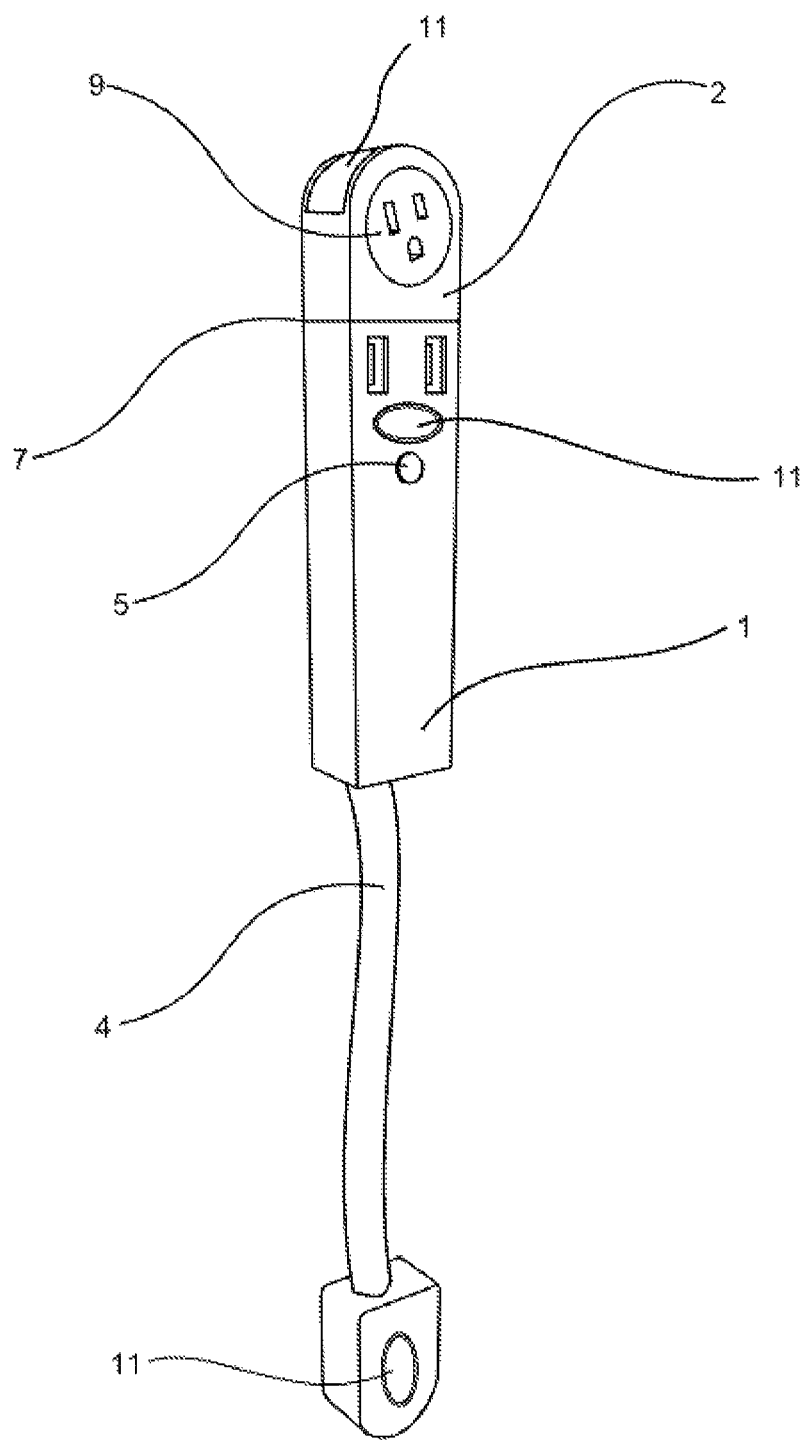
FIG. 4.—Alternative flexible body alternative—front view

FIG. 2 shows a number of different embodiments of the present invention. For example, the (2) access point may be of a different shape such as triangular or rounded to allow additional receptacles to be accessed. Additionally, FIG. 2 shows that the present invention is not limited to only electrical power outlets but also shows an embodiment using CAT5/USB electrical adaptors.

Different features, variations and multiple different embodiments have been shown and described with various details. What has been described in this application at times in terms of specific embodiments is done for illustrative purposes only and without the intent to limit or suggest that what has been conceived is only one particular embodiment or specific embodiments. It is to be understood that this disclosure is not limited to any single specific embodiments or enumerated variations. Many modifications, variations and other embodiments will come to mind of those skilled in the art, and which are intended to be and are in fact covered by both this disclosure. It is indeed intended that the scope of this disclosure should be determined by a proper legal interpretation and construction of the disclosure, including equivalents, as understood by those of skill in the art relying upon the complete disclosure present at the time of filing.

What is claimed is:

1. An outlet access device, comprising:
a rigid body having a male end and a female end;
wherein said male end being capable of insertion into and electrically connected to a matching female wall outlet;
wherein said female end being capable of receiving and electrically connecting to a matching male electrical plug;
wherein said female end being electrically connected to said male end such that electrical power from said matching female wall outlet can be provided to said matching male electrical plug, and
wherein said rigid body comprises an ejector button capable of ejecting said matching male electrical plug from said female end.

2. The outlet access device of claim 1 wherein said male end is rotatable.

3. The outlet access device of claim 2 wherein said female end is rotatable.

4. The outlet access device of claim 1 wherein said body further comprises a fastener.

5. The outlet access device of claim 1 wherein said rigid body further comprises an attachment point.

6. The outlet access device of claim 1 wherein said rigid body is slidably extendable.

7. The outlet access device of claim 1 wherein said rigid body further comprises a light source.

8. The outlet access device of claim 1 wherein said ejector button is positioned above said female end.

9. The outlet access device of claim 1 wherein said female end is a CAT5 receptacle.

10. The outlet access device of claim 1 wherein said rigid body is triangular in cross-section.

11. An outlet access device comprising:

a rigid body having an upper end and a lower end;

said upper end having a rotatable female access point and said lower end having a rotatable male connector wherein said rotatable female access point is electrically connected to said rotatable male connector;

said rigid body having an ejector button capable to push out from said rotatable female access point any connected male plug that was inserted therein; and a fastener to mount said rigid body to a wall; and wherein said rigid body is slidably extendable such that in use, said upper end extends above a usable desk surface.

12. The outlet access device of claim 11 wherein said rigid body further comprises a light source.

13. The outlet access device of claim 11 wherein said device further comprises a flex cord electrically connected between said upper end and said lower end.

14. The outlet access device of claim 11 wherein said rigid body further comprises an attachment point on a side of said rigid body capable of affixing said rigid body to said wall.

15. The outlet access device of claim 11 wherein said rigid body is triangular in cross-section.

16. The outlet access device of claim 11 wherein said female end is a CAT5 receptacle.

17. The outlet access device of claim 11 wherein said upper end further comprises a USB port.

18. The outlet access device of claim 11 wherein said upper end comprises at least 4 rotatable female access points.

19. The outlet access device of claim 16 wherein said upper end further comprises a USB port.

* * * * *